(12) United States Patent
Leiba et al.

(10) Patent No.: US 11,173,408 B2
(45) Date of Patent: *Nov. 16, 2021

(54) SYSTEMS AND METHODS FOR A CONNECTED AUGMENTED ENVIRONMENT

(71) Applicant: Universal City Studios LLC, Universal City, CA (US)

(72) Inventors: Neil Andrew Leiba, Orlando, FL (US); Wei Cheng Yeh, Orlando, FL (US); Travis Jon Cossairt, Celebration, FL (US); Erica Lynn McCay, Orlando, FL (US)

(73) Assignee: Universal City Studios LLC, Universal City, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/995,465

(22) Filed: Aug. 17, 2020

(65) Prior Publication Data
US 2020/0376397 A1 Dec. 3, 2020

Related U.S. Application Data

(63) Continuation of application No. 16/293,351, filed on Mar. 5, 2019, now Pat. No. 10,780,359.

(60) Provisional application No. 62/789,872, filed on Jan. 8, 2019.

(51) Int. Cl.
| | |
|---|---|
| *A63G 31/00* | (2006.01) |
| *H04W 4/021* | (2018.01) |
| *G06K 9/00* | (2006.01) |
| *G06T 19/00* | (2011.01) |

(52) U.S. Cl.
CPC .......... *A63G 31/00* (2013.01); *G06K 9/00335* (2013.01); *G06K 9/00671* (2013.01); *G06T 19/006* (2013.01); *H04W 4/021* (2013.01)

(58) Field of Classification Search
CPC ... A63G 31/00; H04W 4/021; G06K 9/00335; G06K 9/00671; G06T 19/006
See application file for complete search history.

(56) References Cited

U.S. PATENT DOCUMENTS

| | | | |
|---|---|---|---|
| 9,155,971 B1 | 10/2015 | Trowbridge | |
| 9,191,450 B2 | 11/2015 | Sidi et al. | |
| 9,504,930 B2 | 11/2016 | Cortelyou et al. | |
| 9,616,350 B2 | 4/2017 | Stenzler et al. | |

(Continued)

OTHER PUBLICATIONS

PCT/US2020/012160 International Search Report and Written Opinion dated Mar. 27, 2020.

*Primary Examiner* — Jeffery A Brier
(74) *Attorney, Agent, or Firm* — Fletcher Yoder P.C.

(57) ABSTRACT

Systems and methods presented herein include an amusement park system that includes an augmented experience system. The augmented experience system is configured to track guest interactions of a plurality of guests of an amusement park with one or more employees of the amusement park, one or more mobile devices, one or more wearable devices, one or more themed devices, or one or more physical objects disposed within a real-world environment of the amusement park. The augmented experience system is also configured to augment the real-world environment of the amusement park based at least in part on data relating to the guest interactions.

21 Claims, 7 Drawing Sheets

(56) References Cited

U.S. PATENT DOCUMENTS

| | | | |
|---|---|---|---|
| 9,690,373 B2 | 6/2017 | Hasteline | |
| 9,741,145 B2 | 8/2017 | Mitchell et al. | |
| 10,780,359 B2 * | 9/2020 | Leiba | A63G 31/16 |
| 2009/0234666 A1 | 9/2009 | Crawford et al. | |
| 2014/0132400 A1 | 5/2014 | Heaven et al. | |
| 2014/0240102 A1 | 8/2014 | Kawash et al. | |
| 2016/0335802 A1 | 11/2016 | Bradski | |
| 2018/0078858 A1 | 3/2018 | Chai et al. | |
| 2018/0117465 A1 | 5/2018 | Voris et al. | |
| 2018/0124261 A1 | 5/2018 | Weeks | |
| 2018/0253141 A1 | 9/2018 | McCracken | |
| 2019/0220635 A1 | 7/2019 | Yeh et al. | |
| 2019/0220636 A1 | 7/2019 | Yeh et al. | |
| 2019/0221088 A1 | 7/2019 | Yeh et al. | |

* cited by examiner

SYSTEMS AND METHODS FOR A CONNECTED AUGMENTED ENVIRONMENT

CROSS-REFERENCES TO RELATED APPLICATIONS

This application is a continuation of U.S. application Ser. No. 16/293,351, entitled "Systems and Methods for a Connected Augmented Environment," filed Mar. 5, 2019, which claims priority to and the benefit of U.S. Provisional Application No. 62/789,872, entitled "Systems and Methods for a Connected Augmented Environment," filed Jan. 8, 2019, both of which are hereby incorporated by reference in their entireties for all purposes.

FIELD OF DISCLOSURE

The present disclosure relates generally to systems and methods for the creation of a connected augmented environment. More specifically, embodiments of the present disclosure relate generally to systems and methods that enable theme park environments to change over time based, for example, on inputs received from guests of the theme park, as well as other environmental factors.

BACKGROUND

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Amusement parks and/or theme parks may include various entertainment attractions, restaurants, souvenir shops, and rides useful in providing enjoyment to guests (e.g., families and/or people of all ages) of the amusement park. Areas of the amusement park may have different themes that are specifically targeted to certain audiences. For example, certain areas may include themes that are traditionally of interest to children, while other areas may include themes that are traditionally of interest to more mature audiences. Generally, locations having themes associated with such an amusement park may be referred to as an attraction or a themed attraction. These themed attractions may be established using fixed equipment, building layouts, props, decorations, and so forth, most of which may generally relate to a certain theme. However, these themed attractions often include environments that are relatively static in nature, for example, that do not change over time based on the time of day, guest interactions, or other environmental factors.

It is now recognized that it is desirable to include themed attractions where it may be possible to change the environments of the themed attractions in a flexible and efficient manner, relative to traditional techniques. It is also now recognized that it may be desirable to enhance the immersive experience of guests for such themed attractions, and to provide a more personalized or customized experience for guests.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible forms of the subject matter. Indeed, the subject matter may encompass a variety of forms that may be similar to or different from the embodiments set forth below.

In certain embodiments, an amusement park system includes an augmented experience system. The augmented experience system is configured to track guest interactions of a plurality of guests of an amusement park with one or more employees of the amusement park, one or more mobile devices, one or more wearable devices, one or more themed devices, or one or more physical objects disposed within a real-world environment of the amusement park. The augmented experience system is also configured to augment the real-world environment of the amusement park based at least in part on data relating to the guest interactions.

In addition, in certain embodiments, a method includes tracking, via an augmented experience system of an amusement park, guest interactions of a plurality of guests of the amusement park with one or more employees of the amusement park, one or more mobile devices, one or more wearable devices, one or more themed devices, or one or more physical objects disposed within a real-world environment of the amusement park. The method also includes augmenting, via the augmented experience system, the real-world environment of the amusement park based at least in part on data relating to the guest interactions.

Various refinements of the features noted above may be undertaken in relation to various aspects of the present disclosure. Further features may also be incorporated in these various aspects as well. These refinements and additional features may exist individually or in any combination.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. Further, to the extent that certain terms such as parallel, perpendicular, and so forth are used herein, it should be understood that these terms allow for certain deviations from a strict mathematical definition, for example to allow for deviations associated with manufacturing imperfections and associated tolerances.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Embodiments of the present disclosure enable a more dynamic interaction experience for guests, where the physical and visual themed landscape may be affected by external variables such as game play or crowd dynamics. For example, embodiments of the present disclosure enable the physical environment of a themed experience to dynamically change based on guest interaction, time of day, and other environmental factors that are affected by a connected experience. By determining the appearance (e.g., through real-time rendered projection mapping, visuals, and other connected effects such as dynamic animated props affected by guest interaction) of the themed environment based on the crowd dynamics and interaction with the environment, guests can encounter dramatically different landscapes when returning to the same area throughout different parts of the day.

For example, in certain embodiments, guests might encounter a destroyed city early in the morning. Over the course of the day, guests may engage in a connected quest to rebuild the environment throughout the day. As such, in the evening, the area may be physically restored to its full splendor as a result of the collective actions of the guests. The methods of guest interaction with the physical environment may be through a mobile device, through a wearable device (e.g., watch, bracelet, amulet, ring, headband, glasses, and so forth), through other themed device(s), through interaction with employees of the amusement park, through direction interaction with physical objects in the physical environment, or through tracking of the guests via passive tracking devices in the physical environment. Through such interactions, the guests may make their own distinct contribution to the manipulation of the physical landscape (e.g., a guest may create physical mountains of a certain color). The effect may be further manifested through the mobile device where the guest's past and present efforts may be visualized in augmented reality throughout the landscape. The guests are generative of a cohesive group experience that is composed of individual experiences.

Present embodiments relate to systems and methods of providing an augmented experience as part of an amusement park or theme park. For example, in certain embodiments, guests of the amusement park may use mobile devices, wearable devices, or other themed devices that facilitate generation of the augmented experience, which may include generation of augmented reality (AR) images in a real-world environment of the amusement park as well as generation of the physical effects of physical objects disposed within the real-world environment of the amusement park. In addition, in certain embodiments, the guests of the amusement park may directly interact with the physical objects disposed within the amusement park to facilitate the augmented experience. In addition, in certain embodiments, guest interactions with employees of the amusement park may be tracked (e.g., with the employees interacting with their own mobile devices, their own wearable devices, their own themed devices, and/or with the physical objects disposed within the real-world environment of the amusement park, as instructed by the guests) to facilitate the augmented experience. In addition, in certain embodiments, the guests themselves may be tracked via passive tracking devices disposed within the amusement park to facilitate the augmented experience. As such, the systems and methods described herein may track guest interactions with the amusement park in various ways over the course of a day such that the real-world environment may be modified during the day based on the guest interactions as well as other environmental factors, such as the current time of day, the current date, the current weather, and so forth.

In certain embodiments, an image generation system may render a real-time video stream of AR images to be displayed in the real-world environment of the amusement park. For example, in certain embodiments, the image generation system may render the AR images based at least in part on, guest interactions received from the mobile devices, the wearable devices, the other themed devices, and/or the physical objects disposed within the amusement park, wherein the guest interactions include guest manipulations (e.g., interaction with input devices) of the mobile devices, the wearable devices, the other themed devices, and/or the physical objects disposed within the amusement park, position, orientation, and/or motion of the mobile devices, the wearable devices, the other themed devices, and/or the guests themselves, proximity of the mobile devices, the wearable devices, the other themed devices, and/or the guests themselves with respect to particular physical objects disposed in the real-world environment of the amusement park, local settings entered by the guests into the mobile devices and/or the wearable devices, global settings of the amusement park (e.g., as entered by proprietors of the amusement park), prior interactions performed via the mobile devices, the wearable devices, and/or the other themed devices, the other environmental factors (e.g., the current time of day, the current date, the current weather, and so forth), and so forth.

In certain embodiments, the mobile devices, the wearable devices, the other themed devices, the physical objects disposed in the real-world environment of the amusement park, and/or the guests themselves may be monitored by a monitoring system, which may communicate data (e.g., the guest interactions with, the position, orientation, and/or motion of, the proximity with particular physical objects, and so forth) relating to the mobile devices, the wearable devices, the other themed devices, the physical objects, and/or the guests themselves, to the image generation system, such that the image generation system may generate the AR images based at least in part on the data relating to the mobile devices, the wearable devices, the other themed devices, the physical objects, and/or the guests themselves. In addition, in certain embodiments, the monitoring system may be configured to communicate with a physical interaction system that is configured to cause physical effects (e.g., movement effects, sound effects, haptic feedback effects, color effects, scented effects, and so forth) of the physical objects disposed within the real-world environment of the amusement park based at least in part on the data relating to the mobile devices, the wearable devices, the other themed devices, the physical objects, and/or the guests themselves. Furthermore, in certain embodiments, certain employees of the amusement park may modify their actions based at least in part on the data relating to the mobile devices, the wearable devices, the other themed devices, the physical objects, and/or the guests themselves.

In this way, the image generation system, the monitoring system, and the physical interaction system may be used to create the augmented experience, which may include generation of the AR images in the real-world environment of the amusement park as well as generation of the physical effects of the physical objects disposed within the real-world environment of the amusement park, thereby enhancing the guests' overall experience within the amusement park. However, it should be appreciated that the techniques described herein may not be limited to amusement park attraction applications, but may also be extended to any of various applications such as, for example, medical applications (e.g., image-guided surgery, noninvasive imaging analysis), engineering design applications (e.g., engineering model development), manufacturing, construction, and maintenance applications (e.g., products manufacturing, new building construction, automobile repairs), academic and/or vocational training applications, exercise applications (e.g., bodybuilding and weight loss models), television (TV) applications (e.g., weather and news), and the like.

Figure 1:
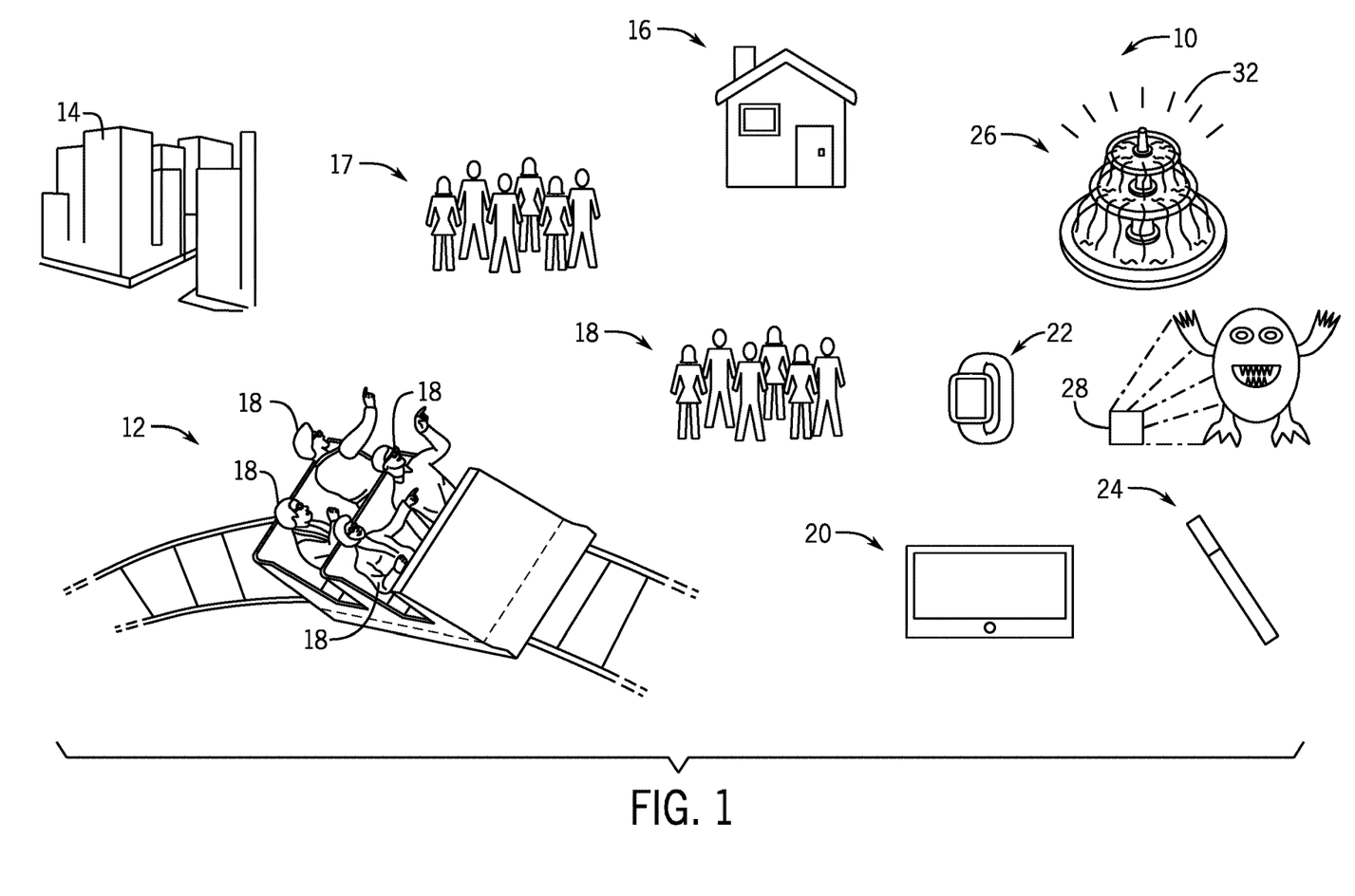
FIG. 1 illustrates an amusement park including one or more attractions, in accordance with embodiments of the present disclosure.

With the foregoing mind, it may be useful to describe an embodiment of an amusement park 10 as depicted in FIG. 1. As illustrated, the amusement park 10 may include thrill rides 12, amusement park facilities 14 (e.g., restaurants, souvenir shops, and so forth), additional amusement park attractions 16, and amusement park employees 17 (e.g., acting as themed characters, for example). As described in greater detail herein, guests 18 of the amusement park 10 may be provided with an augmented experience within the real-world environment of the amusement park 10. For example, as illustrated in FIG. 1, in certain embodiments, the guests 18 of the amusement park 10 may interact with mobile devices 20, wearable devices 22, other themed devices 24, and/or physical objects 26 (e.g., dynamic animated props) disposed within the real-world environment of the amusement park 10, may interact with the employees 17 of the amusement park 10 (who, in turn, interact with mobile devices 20, wearable devices 22, other themed devices 24, and/or physical objects 26 for the guests 18), or may be passively tracked by a monitoring system, as described in greater detail herein, to generate an augmented experience that, for example, changes over time during a day of operation of the amusement park 10. For example, in certain embodiments, AR images may be generated via one or more AR image generators 28, such as AR image displays configured to display AR images and/or AR image projectors configured to project the AR images in the real-world environment of the amusement park 10. In addition, in certain embodiments, one or more physical effects 32 may be generated for one or more of the physical objects 26 disposed within the real-world environment of the amusement park 10.

In certain embodiments, the mobile devices 20 may be mobile phones (e.g., smartphones), tablet computers, or any other suitable devices that can be carried around the amusement park 10 by a guest 18. In certain embodiments, the wearable devices 22 may be watch-like electronic devices, glasses, goggles, bracelets, amulets, rings, headbands, glasses, hats, helmets, t-shirts, jackets, coats, shorts, pants, shoes, boots, or any other conveniently wearable items. In certain embodiments, the themed devices 24 may be amusement park theme-related objects, such as toy guns, swords, flags, wands, and so forth. As described in greater detail herein, in certain embodiments, the wearable devices 22 and/or the themed devices 24 may either include circuitry (e.g., small chips) disposed within them (e.g., sewn within clothing material, and so forth) or may include unique patterns (e.g., images, and so forth) that may be passively tracked by a monitoring system.

Figure 2:
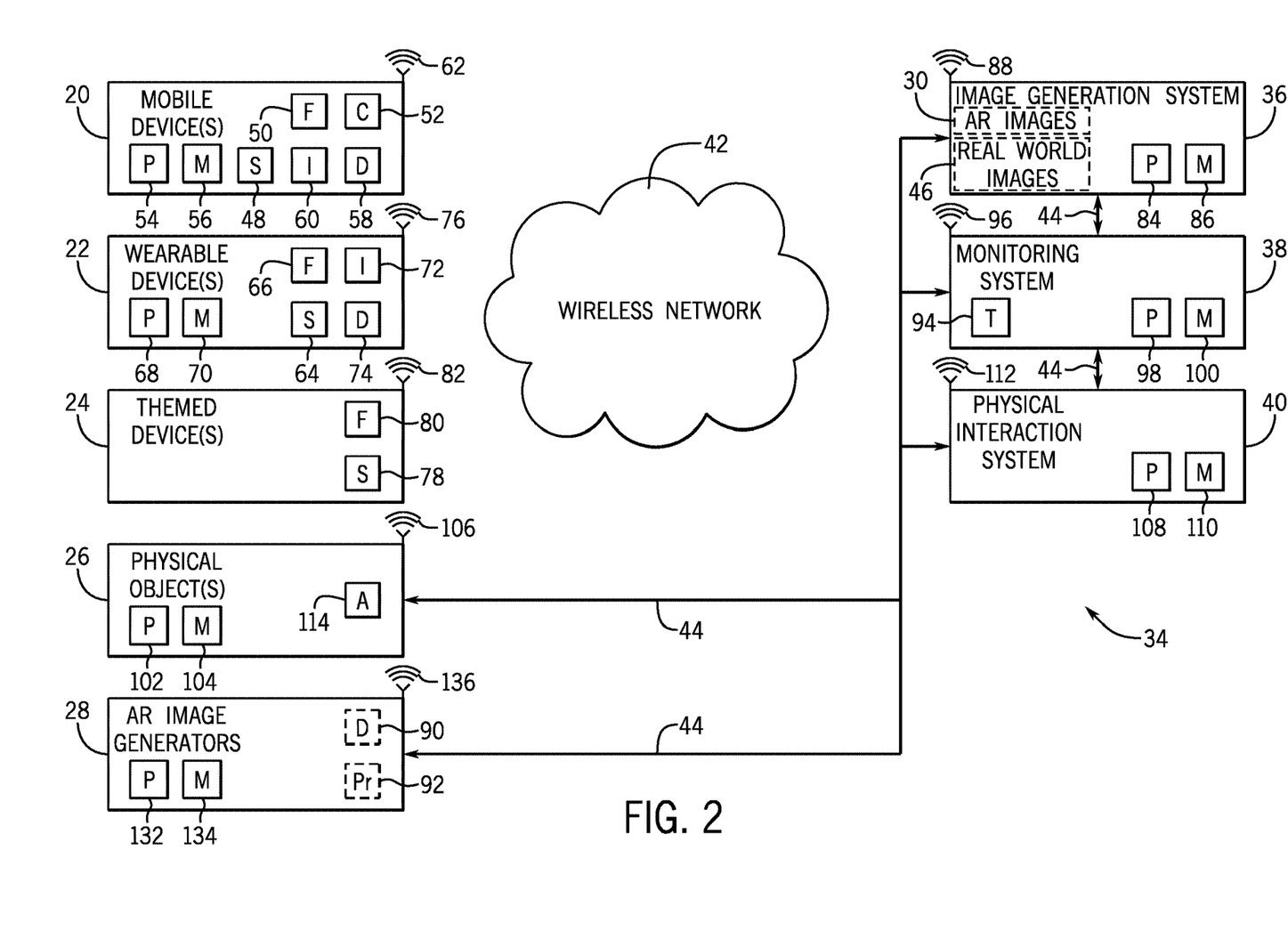
FIG. 2 is a schematic diagram of a system for providing an augmented experience for an amusement park, in accordance with embodiments of the present disclosure.

FIG. 2 is a schematic diagram of an augmented experience system 34 for providing an augmented experience for the amusement park 10 illustrated in FIG. 1, in accordance with embodiments of the present disclosure. As illustrated in FIG. 2, in certain embodiments, the augmented experience system 34 may include one or more mobile devices 20, one or more wearable devices 22, one or more other themed devices 24, and/or one or more physical objects 26 that may be interacted with by the guests 18 of the amusement park 10 (and/or by the employees 17 of the amusement park 10 for the guests 18). The mobile device(s) 20, the wearable device(s) 22, the other themed device(s) 24, the physical object(s) 26, and/or one or more AR image generators 28 may be communicatively coupled to an image generation system 36, a monitoring system 38, and/or a physical interaction system 40 (e.g., within the amusement park 10) via a wireless network 42 (e.g., wireless local area networks (WLAN), wireless wide area networks (WWAN), near field communication (NFC) networks, or any other suitable wireless networks). In addition, in certain embodiments, the physical object(s) 26 and/or the AR image generator(s) 28 may be communicatively coupled to the image generation system 36, the monitoring system 38, and/or the physical interaction system 40 via the wireless network 42 and/or via direct physical connection 44 (e.g., using communication cables).

As described in greater detail herein, the image generation system 36, the monitoring system 38, and the physical interaction system 40 may collaborate with each other to use guest interactions with the mobile device(s) 20, the wearable device(s) 22, the other themed device(s) 24, and/or the physical object(s) 26 disposed within the real-world environment of the amusement park 10 (e.g., either directly from the guests 18 or indirectly from the employees 17) to generate the augmented experience for the amusement park 10. For example, in certain embodiments, the image generation system 36 may be configured to use the guest interactions with the mobile device(s) 20, the wearable device(s) 22, the other themed device(s) 24, and/or the physical object(s) 26 disposed within the real-world environment of the amusement park 10 (e.g., either directly from the guests 18 or indirectly from the employees 17) to generate AR images 30 that may be displayed and/or projected into the real-world environment of the amusement park 10. In certain embodiments, the image generation system 36 may generate a real-time video stream that includes real-world images 46 electronically merged with the AR images 30. The term "real-time" indicates that the images are obtained and/or provided in a timeframe substantially close to the time of actual observation.

In addition, in certain embodiments, the physical interaction system 40 may be configured to use the guest interactions with the mobile device(s) 20, the wearable device(s) 22, the other themed device(s) 24, and/or the physical object(s) 26 disposed within the real-world environment of the amusement park 10 (e.g., either directly from the guests 18 or indirectly from the employees 17) to generate the physical effects 32 of the physical object(s) 26. Furthermore, in certain embodiments, the monitoring system 38 may be configured to monitor the mobile device(s) 20, the wearable device(s) 22, the other themed device(s) 24, and/or the physical object(s) 26 to detect the guest interactions with the mobile device(s) 20, the wearable device(s) 22, the other themed device(s) 24, and/or the physical object(s) 26, and to transmit the guest interactions to the image generation system 36 and/or the physical interaction system 40 to enable those systems to generate the AR images 30 and/or the physical effects 32, respectively. Furthermore, in certain embodiments, the monitoring system 38 may be configured to passively monitor the guests 18, and to transmit data relating to the passively monitored guests 18 to the image generation system 36 and/or the physical interaction system 40 to enable those systems to generate the AR images 30 and/or the physical effects 32, respectively.

In certain embodiments, the mobile device(s) 20 may include one or more orientation and position sensors 48 (e.g., accelerometers, magnetometers, gyroscopes, Global Positioning System (GPS) receivers, motion tracking sensors such as electromagnetic and solid-state motion tracking sensors, and so forth) that may be used to track the position, orientation, motion, and so forth, of the mobile device(s) 20. Similarly, in certain embodiments, features 50 (e.g., geometric aspects or markings) of the mobile device(s) 20 may be monitored by the monitoring system 38 (e.g., one or more cameras, in certain embodiments) to determine the position, orientation, motion, and so forth, of the mobile device(s) 20. Furthermore, in certain embodiments, the guests 18 may be passively monitored by the monitoring system 38 (e.g., a camera system, such as a light detection and ranging (LiDAR) system) to identify the position, orientation, motion, and so forth, of the guests 18, as well as to detect unique features about the guests 18, such as facial recognition, and so forth, in certain embodiments.

In addition, in certain embodiments, the mobile device(s) 20 may include one or more cameras 52 configured to capture images and video (e.g., the real-world images), and to display the captured images and video (as well as the AR images 30) via one or more displays 58 of the mobile device(s) 20. In certain embodiments, to support the creation of the augmented experience, the mobile device(s) 20 may include processing circuitry, such as a processor 54 and a memory 56. The processor 54 may be operatively coupled to the memory 56 to execute instructions for at least partially carrying out the presently disclosed techniques of generating real-world images 46 merged with AR images 30, which in certain embodiments, may be displayed on the one or more displays 58 of the mobile device(s) 20, to enhance the augmented experience of the guests 18. In addition, in certain embodiments, the processor 54 may execute instructions stored in the memory 56 to process guest interactions received via one or more inputs 60 of the mobile device(s) 20. These instructions may be encoded in programs or code stored in a tangible non-transitory computer-readable medium, such as the memory 56 and/or other storage. In certain embodiments, the processor 54 may be a general-purpose processor, system-on-chip (SoC) device, an application-specific integrated circuit (ASIC), or some other similar processor configuration.

In certain embodiments, the one or more displays 58 of the mobile device(s) 20 may each include a liquid crystal display (LCD), an organic light emitting diode (OLED) display, or other similar display useful in displaying the real-world images 46 and the AR images 30 to the guests 18. In certain embodiments, the one or more displays 58 may each include an opaque or see-through LCD or an opaque or see-through OLED display useful in allowing, for example, the guests 18 to view the real-world images 46 and the AR images 30 appearing on the displays 58 while preserving the ability to see through the respective displays 58 to the actual and physical real-world environment of the amusement park 10.

In certain embodiments, the one or more cameras 52 of the mobile device(s) 20 may be used to capture real-time video data (e.g., live video) of the real-world environment of the amusement park 10. In certain embodiments, the mobile device(s) 20 may then transmit (e.g. wirelessly via one or more communications interfaces 62 included in the mobile device(s) 20) real-time video data captured via the one or more cameras 52 to the image generation system 36 for processing. In addition, in certain embodiments, the mobile device(s) 20 may also transmit orientation data, position data, motion tracking data, and so forth, obtained and/or derived based at least in part on data obtained via the orientation and position sensors 48 of the mobile device(s) 20 to the image generation system 36 and/or the physical interaction system 40 via the one or more communications interfaces 62. Furthermore, in certain embodiments, the mobile device(s) 20 may also transmit data relating to guest interactions with the mobile device(s) 20 via the one or more inputs 60 to the image generation system 36 and/or the physical interaction system 40 via the one or more communications interfaces 62.

In certain embodiments, the wearable device(s) 22 may include one or more orientation and position sensors 64 (e.g., accelerometers, magnetometers, gyroscopes, Global Positioning System (GPS) receivers, motion tracking sensors such as electromagnetic and solid-state motion tracking sensors, and so forth) that may be used to track the position, orientation, motion, and so forth, of the wearable device(s) 22. In other embodiments, the wearable device(s) 22 may be passive objects (i.e., that include no sensors, control circuitry, and so forth), the orientation, position, and motion of which may, for example, be tracked by the monitoring system 38. In such embodiments, certain features 66 of the wearable device(s) 22, such as passive features (e.g., geometric aspects or markings, radio frequency identification (RFID) tags, and so forth) or more active features (e.g., wireless transmitters, such as ultra-wideband (UWB) radio transmitters, and so forth) may be monitored by the monitoring system 38 to determine the orientation, position, and motion, and so forth, of the wearable device(s) 22.

In certain embodiments, to support the creation of the augmented experience, the wearable device(s) 22 may include processing circuitry, such as a processor 68 and a memory 70. The processor 68 may be operatively coupled to the memory 70 to execute instructions for processing guest interactions received via one or more inputs 72 of the wearable device(s) 22. These instructions may be encoded in programs or code stored in a tangible non-transitory computer-readable medium, such as the memory 70 and/or other storage. In certain embodiments, the processor 68 may be a general-purpose processor, system-on-chip (SoC) device, an application-specific integrated circuit (ASIC), or some other similar processor configuration.

In certain embodiments, one or more displays 74 of the wearable device(s) 22 may each include a liquid crystal display (LCD), an organic light emitting diode (OLED) display, or other similar display useful in displaying the real-world images 46 and the AR images 30 to the guests 18. In certain embodiments, the one or more displays 74 may each include an opaque or see-through LCD or an opaque or see-through OLED display useful in allowing, for example, the guests 18 to view the real-world images 46 and the AR images 30 appearing on the displays 74 while preserving the ability to see through the respective displays 74 to the actual and physical real-world environment of the amusement park 10.

In certain embodiments, the wearable device(s) 22 may transmit orientation data, position data, motion tracking data, and so forth, obtained and/or derived based at least in part on data obtained via the orientation and position sensors 64 of the wearable device(s) 22 to the image generation system 36 and/or the physical interaction system 40 via one or more communications interfaces 76 of the wearable device(s) 22. Furthermore, in certain embodiments, the wearable device(s) 22 may also transmit data relating to guest interactions with the wearable device(s) 22 via the one or more inputs 72 to the image generation system 36 and/or the physical interaction system 40 via the one or more communications interfaces 76.

In certain embodiments, the themed device(s) 24 may include one or more orientation and position sensors 78 (e.g., accelerometers, magnetometers, gyroscopes, Global Positioning System (GPS) receivers, motion tracking sensors such as electromagnetic and solid-state motion tracking sensors, and so forth) that may be used to track the position, orientation, motion, and so forth, of the themed device(s) 24. In other embodiments, the themed device(s) 24 may be passive objects (i.e., that include no sensors, control circuitry, and so forth), the orientation, position, and motion of which may, for example, be tracked by the monitoring system 38. In such embodiments, certain features 80 of the themed device(s) 24, such as passive features (e.g., geometric aspects or markings, radio frequency identification (RFID) tags, and so forth) or more active features (e.g., wireless transmitters, such as ultra-wideband (UWB) radio transmitters, and so forth) may be monitored by the monitoring system 38 to determine the orientation, position, and motion, and so forth, of the themed device(s) 24. In certain embodiments, the themed device(s) 24 may transmit orientation data, position data, motion tracking data, and so forth, obtained and/or derived based at least in part on data obtained via the orientation and position sensors 78 of the themed device(s) 24 to the image generation system 36 and/or the physical interaction system 40 via one or more communications interfaces 82 of the themed device(s) 24.

In certain embodiments, as described in greater detail herein, the image generation system 36 may include processing circuitry, such as a processor 84 (e.g., general purpose processor or other processor) and a memory 86, which may process the data relating to guest interactions with the mobile device(s) 20, the wearable device(s) 22, the themed device(s) 24, and/or the physical object(s) 26 disposed within the real-world environment of the amusement park 10, which may be received from the mobile device(s) 20, the wearable device(s) 22, the themed device(s) 24, and/or the physical object(s) 26 disposed within the real-world environment of the amusement park 10 (e.g., either directly from the guests 18 or indirectly from the employees 17) or from the monitoring system 38 via one or more communications interfaces 88 of the image generation system 36, to generate AR images 30 that may be generated via the displays 58, 74 of the mobile device(s) 20 and the wearable device(s) 22, respectively, and/or that may be generated via the AR image generator(s) 28. Furthermore, in certain embodiments, in addition to the AR images 30 (e.g., AR augmentations), the image generation system 36 may also trigger one or more movement effects, sound effects, haptic feedback effects, color effects, scented effects, and so forth, to be implemented via internal components of the mobile device(s) 20, the wearable device(s) 22, and/or the themed device(s) 24 that may coincide with the appearances of the AR images 30. Instructions to perform these functions may be encoded in programs or code stored in a tangible non-transitory computer-readable medium, such as the memory 86 and/or other storage. In certain embodiments, the processor 84 may be a general-purpose processor, system-on-chip (SoC) device, an application-specific integrated circuit (ASIC), or some other similar processor configuration.

In certain embodiments, as described in greater detail herein, the image generation system 36 may also generate and render one or more AR images 30 superimposed on the real-world images 46 to create a complete AR experience for the guests 18. For example, in certain embodiments, the image generation system 36 may utilize video merging and/or optical merging techniques to superimpose the AR images 30 onto the real-world images 46, such that the guests 18 perceive the real-world physical environment of the amusement park 10 along with the AR images 30 (e.g., virtual augmentations). Specifically, in certain embodiments, the image generation system 36 may render a view of the AR images 30 that is temporally and spatially commensurate with the real-world images 46, such that the real-world images 46 may appear as a background overlaid with the AR images 30.

In certain embodiments, the image generation system 36 is configured to generate the one or more AR images 30 based at least in part on data relating to guest interactions with the mobile device(s) 20, the wearable device(s) 22, the themed device(s) 24, and/or the physical object(s) 26 disposed within the real-world environment of the amusement park 10 (e.g., either directly from the guests 18 or indirectly from the employees 17), such as interactions with inputs 60, 72 of the mobile device(s) 20 and the wearable device(s) 22, respectively (or, indeed, of inputs of the physical object(s) 26, in certain embodiments), position, orientation, and/or motion of the mobile device(s) 20, the wearable device(s) 22, the themed device(s) 24, and/or the guests 18 themselves, proximity of the mobile device(s) 20, the wearable device(s) 22, the themed device(s) 24, and/or the guests 18 themselves with respect to particular physical object(s) 26 disposed in the real-world environment of the amusement park 10, local settings entered by the guests into the mobile device(s) 20 and/or the wearable device(s) 22, global settings of the amusement park 10 (e.g., as entered by proprietors of the amusement park 10), prior interactions performed via the mobile device(s) 20, the wearable device(s) 22, the themed device(s) 24, and/or the physical object(s) 26 disposed within the real-world environment of the amusement park 10, the other environmental factors (e.g., the current time of day, the current date, the current weather, and so forth), and so forth. As described in greater detail herein, the data relating to the guest interactions with the mobile device(s) 20, the wearable device(s) 22, the themed device(s) 24, and/or the physical object(s) 26 disposed within the real-world environment of the amusement park 10 (e.g., either directly from the guests 18 or indirectly from the employees 17) may be received directly from the mobile device(s) 20, the wearable device(s) 22, the themed device(s) 24, and/or the physical object(s) 26 disposed within the real-world environment of the amusement park 10 (e.g., via the respective communications interfaces) or may be received from the monitoring system 38.

In certain embodiments, once the image generation system 36 generates the one or more AR images 30, the image generation system 36 may transmit the generated AR images 30 (and, in certain embodiments, real-word images 46) to the AR image generators 28 such that the AR image generators 28 may display the AR images 30 (and, in certain embodiments, the real-world images 46) on one or more displays 90 of the AR image generators 28, or may project the AR images 30 (and, in certain embodiments, the real-world images 46) via one or more projectors 92 of the AR image generators 28. In addition, in certain embodiments, once the image generation system 36 generates the one or more AR images 30, the image generation system 36 may transmit the generated AR images 30 (and, in certain embodiments, real-word images 46) to the mobile device(s) 20 and/or the wearable device(s) 22 such that the mobile device(s) 20 and/or the wearable device(s) 22 may display the AR images 30 (and, in certain embodiments, the real-world images 46) on the displays 58, 74 of the mobile device(s) 20 and/or the wearable device(s) 22, respectively.

In certain embodiments, as described in greater detail herein, the image generation system 36 may generate and render the one or more AR images 30 based at least in part on orientation data, position data, and motion tracking data of the mobile device(s) 20, the wearable device(s) 22, the themed device(s) 24, and/or the guests 18 themselves, which may be detected by the monitoring system 38. For example, in certain embodiments, the monitoring system 38 may include one or more tracking devices 94 (e.g., one or more cameras, such as a light detection and ranging (LiDAR) system, in certain embodiments) configured to detect orientation data, position data, and motion tracking data of the mobile device(s) 20, the wearable device(s) 22, the themed device(s) 24, and/or the guest(s) 18 themselves. Then, the monitoring system 38 may communicate the orientation data, position data, and motion tracking data of the mobile device(s) 20, the wearable device(s) 22, the themed device(s) 24, and/or the guest(s) 18 to the image generation system 36 via one or more communications interfaces 96 of the monitoring system 38, and the image generation system 36 may generate AR images 30 to be generated via the AR image generators 28 and/or to be displayed on the displays 58, 74 of the mobile device(s) 20 and/or the wearable device(s) 22 based at least in part on the orientation data, position data, and motion tracking data of the mobile device(s) 20, the wearable device(s) 22, and/or the themed device(s) 24. Furthermore, in certain embodiments, the one or more tracking devices 94 may be configured to perform facial recognition of the guest(s) 18 to detect identities of the guest(s) 18, emotions of the guest(s) 18, and so forth, the monitoring system 38 may communicate data relating to the facial recognition of the guest(s) 18 to the image generation system 36 via the one or more communications interfaces 96 of the monitoring system 38, and the image generation system 36 may generate AR images 30 to be generated via the AR image generators 28 and/or to be displayed on the wearable device(s) 22 based at least in part on the facial recognition of the guest(s) 18.

Furthermore, in certain embodiments, the monitoring system 38 may include processing circuitry, such as a processor 98 (e.g., general purpose processor or other processor) and a memory 100, and may process the orientation data, position data, and motion tracking data of the mobile device(s) 20, the wearable device(s) 22, the themed device(s) 24, and/or the guest(s) 18 (and/or data relating to the facial recognition of the guest(s) 18) detected by the one or more tracking devices 94 to, for example, convert the data into a form suitable for the image generation system 36 and/or the physical interaction system 40. Instructions to perform these functions may be encoded in programs or code stored in a tangible non-transitory computer-readable medium, such as the memory 100 and/or other storage. In certain embodiments, the processor 98 may be a general-purpose processor, system-on-chip (SoC) device, an application-specific integrated circuit (ASIC), or some other similar processor configuration.

Similarly, in certain embodiments, as described in greater detail herein, the image generation system 36 may generate and render the one or more AR images 30 based at least in part on orientation data, position data, and motion tracking data of the guests 18 (and/or facial recognition of the guests 18), which may be detected by the monitoring system 38. For example, in certain embodiments, the one or more tracking devices 94 of the monitoring system 38 may detect orientation data, position data, and motion tracking data of the guests 18 (e.g., including detecting the bodies of the guests 18, detecting patterns of hand gestures of the guests 18, and so forth). Then, the monitoring system 38 may communicate the orientation data, position data, and motion tracking data of the guests 18 to the image generation system 36 via the one or more communications interfaces 96 of the monitoring system 38, and the image generation system 36 may generate AR images 30 to be generated via the AR image generators 28 and/or to be displayed on the displays 58, 74 of the mobile device(s) 20 and/or the wearable device(s) 22 based at least in part on the orientation data, position data, and motion tracking data of the guests 18. Furthermore, as described herein, in certain embodiments, the one or more tracking devices 94 may be configured to perform facial recognition of the guest(s) 18 to detect identities of the guest(s) 18, emotions of the guest(s) 18, and so forth, the monitoring system 38 may communicate data relating to the facial recognition of the guest(s) 18 to the image generation system 36 via the one or more communications interfaces 96 of the monitoring system 38, and the image generation system 36 may generate AR images 30 to be generated via the AR image generators 28 and/or to be displayed on the displays 58, 74 of the mobile device(s) 20 and/or the wearable device(s) 22 based at least in part on the facial recognition of the guest(s) 18. Furthermore, in certain embodiments, the processing circuitry of the monitoring system 38 may process the data detected by the one or more tracking devices 94 to, for example, convert the data into a form suitable for the image generation system 36 and/or the physical interaction system 40.

Furthermore, in certain embodiments, the AR image generators 28 may include processing circuitry, such as a processor 132 and a memory 134. The processor 132 may be operatively coupled to the memory 134 to execute instructions for determining and/or setting certain operational states for the particular AR image generator 28. These instructions may be encoded in programs or code stored in a tangible non-transitory computer-readable medium, such as the memory 134 and/or other storage. In certain embodiments, the processor 132 may be a general-purpose processor, system-on-chip (SoC) device, an application-specific integrated circuit (ASIC), or some other similar processor configuration. In certain embodiments, the processor 132 of a particular AR image generator 28 may be configured to cause AR images 30 received from the image generation system 36 (e.g., via one or more communications interfaces 136 of the AR image generator 28) to be generated such as, for example, displaying the AR images 30 (and, in certain embodiments, the real-world images 46) on one or more displays 90 of the AR image generator 28, or projecting the AR images 30 (and, in certain embodiments, the real-world images 46) via one or more projectors 92 of the AR image generator 28.

Furthermore, in certain embodiments, as described in greater detail herein, the image generation system 36 may generate and render the one or more AR images 30 based at least in part on data relating to certain physical objects 26 of the amusement park 10. For example, in certain embodiments, the physical objects 26 may include processing circuitry, such as a processor 102 and a memory 104. The processor 102 may be operatively coupled to the memory 104 to execute instructions for determining and/or setting certain operational states for the particular physical object 26. These instructions may be encoded in programs or code stored in a tangible non-transitory computer-readable medium, such as the memory 104 and/or other storage. In certain embodiments, the processor 102 may be a general-purpose processor, system-on-chip (SoC) device, an application-specific integrated circuit (ASIC), or some other similar processor configuration. In certain embodiments, the processor 102 of a particular physical object 26 may be configured to determine whether a particular physical effect 32 has been activated for the physical object 26, and communicate this determination to the image generation system 36 via one or more communications interfaces 106 of the physical object 26, and the image generation system 36 may generate AR images 30 to be generated via the AR image generators 28 and/or to be displayed on the displays 58, 74 of the mobile device(s) 20 and/or the wearable device(s) 22 based at least in part on this determination.

As such, the physical interaction system 40 enables the generation of physical effects 32 (e.g., movement effects, sound effects, haptic feedback effects, color effects, scented effects, and so forth) of certain physical objects 26 of the amusement park 10. Specifically, the physical interaction system 40 may be used to generate the physical effects 32 of certain physical objects 26 of the amusement park 10. In certain embodiments, as described in greater detail herein, the physical interaction system 40, which may include processing circuitry, such as a processor 108 (e.g., general purpose processor or other processor) and a memory 110, may process data from the mobile device(s) 20, the wearable device(s) 22, the themed device(s) 24, the physical object(s) 26, the image generation system 36, and the monitoring system 38 to determine the types of physical effects 32 that should be generated for certain physical objects 26. In particular, it will be appreciated that all of the different types of data described above as being communicated between the mobile device(s) 20, the wearable device(s) 22, the themed device(s) 24, the physical object(s) 26, the image generation system 36, and the monitoring system 38 may also be communicated to/from those components of the amusement park 10 and one or more communications interfaces 112 of the physical interaction system 40, and the physical interaction system 40 may determine certain physical effects 32 that should be generated for certain physical objects 26 based at least in part on this data, and may communicate control signals to those physical objects 26 to generate (i.e., implement) the physical effects 32. These instructions may be encoded in programs or code stored in a tangible non-transitory computer-readable medium, such as the memory 110 and/or other storage. In certain embodiments, the processor 108 may be a general-purpose processor, system-on-chip (SoC) device, an application-specific integrated circuit (ASIC), or some other similar processor configuration.

As such, in certain embodiments, the physical effects 32 to be implemented for the one or more physical objects 26 may be determined by the physical interaction system 40, and the physical interaction system 40 may communicate with the particular physical objects 26 (e.g., via the communication interfaces 106, 112) to cause the physical effects 32 to be implemented, for example, via physical actuation mechanisms 114 that are associated with the physical objects 26. For example, in certain embodiments, the physical effects 32 may be electrical sparks emanating from the physical object 26 as generated by an electrical power source, flames emanating from the physical object 26 as generated by an ignition system, movement of a portion of the physical object 26, and so forth.

As such, the image generation system 36, the monitoring system 38, and the physical interaction system 40 are configured to cooperatively operate together to create an augmented experience for the guests 18 of the amusement park 10, wherein the real-world environment of the amusement park 10 is augmented, for example, via the generation of AR images 30 in the real-world environment of the amusement park 10 and/or the generation of physical effects 32 of physical object(s) 26 disposed within the real-world environment of the amusement park 10. In particular, the AR images 30 and the physical effects 32 that are generated by the image generation system 36 and the physical interaction system 40, respectively, may be determined by taking into account all of the guest interactions described herein with the mobile device(s) 20, the wearable device(s) 22, the themed device(s) 24, and/or the physical object(s) 26 disposed within the real-world environment of the amusement park 10 (e.g., either directly from the guests 18 or indirectly from the employees 17) that occur over a given time period, for example, over the course of a single day of operation of the amusement park 10. For example, in certain embodiments, the image generation system 36, the monitoring system 38, and the physical interaction system 40 may collectively monitor the guest interactions described herein during all hours of operation of the amusement park 10 such that all of the guest interactions described herein may be considered when creating the augmented experience described herein.

Figure 3:
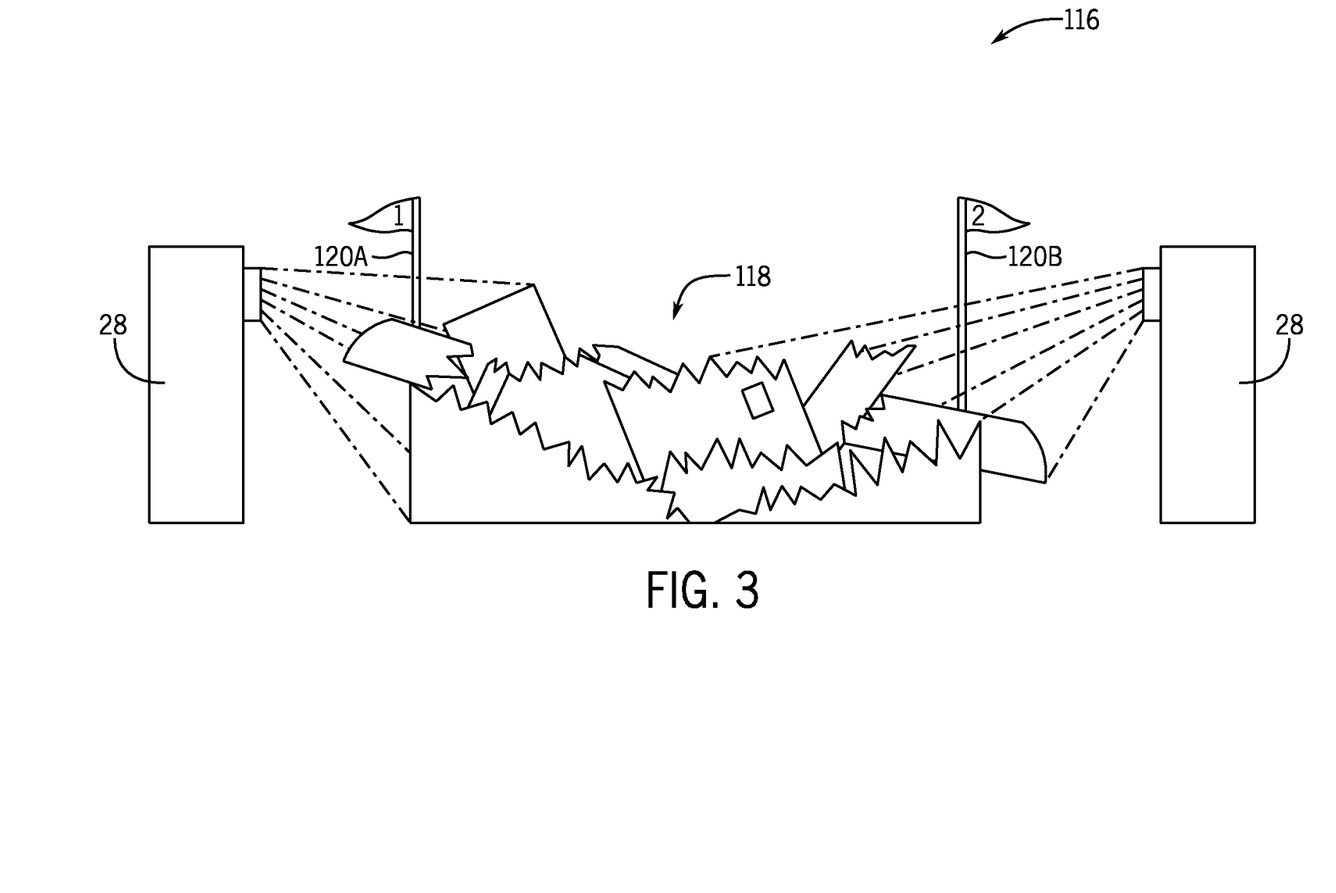
FIG. 3 illustrates a themed attraction of an amusement park at the beginning of a day of operation of the amusement park, in accordance with embodiments of the present disclosure.
Figure 4:
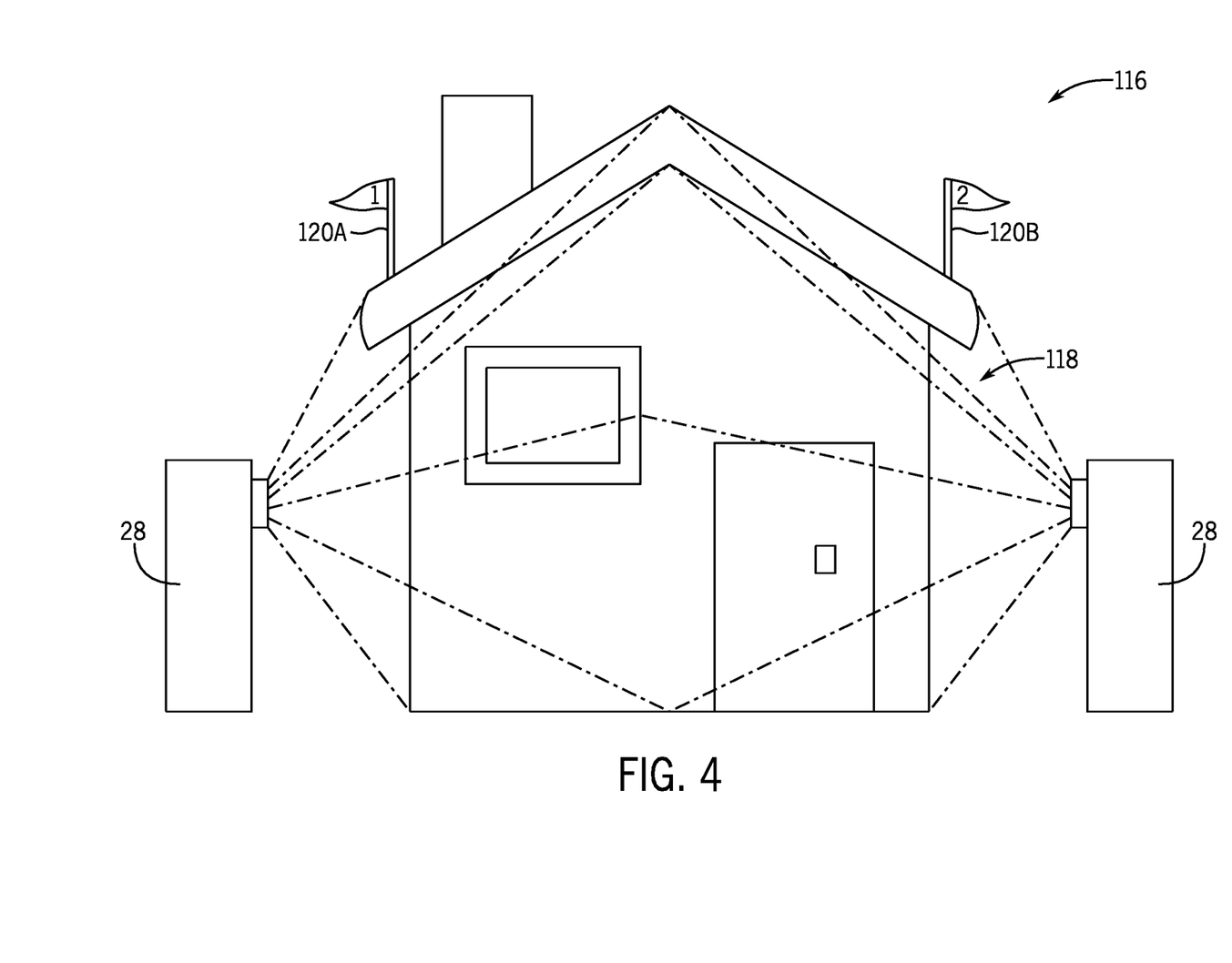
FIG. 4 illustrates the themed attraction of an amusement park at the end of the day of operation of the amusement park, in accordance with embodiments of the present disclosure.

To illustrate an example of how the image generation system 36, the monitoring system 38, and the physical interaction system 40 may cooperate with each other to create an augmented experience as described herein, FIG. 3 illustrates a themed attraction 116 of an amusement park 10 at the beginning of a day of operation of the amusement park 10, and FIG. 4 illustrates the themed attraction 116 of the amusement park 10 at the end of the day of operation of the amusement park 10, in accordance with embodiments of the present disclosure. As illustrated in FIG. 3, at the beginning of the day of operation of the amusement park 10, AR image generator(s) 28 may be generating AR images 30 that depict a destroyed structure 118 (e.g., a house or other type of building or edifice), and various physical objects 26 may include various faction flags 120 (i.e., which are the physical objects 26) that are not in a raised position. Conversely, as illustrated in FIG. 4, at the end of the day of operation of the amusement park 10, the AR image generator(s) 28 may be generating AR images 30 that depict the structure 118 having been restored, and the various faction flags 120 being raised (i.e., as generated physical effects 32, as instructed by the physical interaction system 40) to different heights that, for example, correspond to a number of guests 18 that have voted for the corresponding factions during the course of operation of the amusement park 10 for the day.

As such, the image generation system 36, the monitoring system 38, and the physical interaction system 40 may track the collective actions of the guests 18 of the amusement park 10, for example, during a day of operation of the amusement park 10 such that the guests 18 are provided with a connected augmented experience. Specifically, by interacting with certain themed attractions 116 during the course of operation of a day at the amusement park 10 (e.g., either directly or indirectly via the employees 17), the guests 18 may feel that they have made significant contributions to the themed attractions 116 of the amusement park 10 that are most important to them. However, in the interest of preventing certain guests 18 from essentially taking control of certain themed attractions 116, for example, by spending the entire day of operation interacting with a single themed attraction 116, in certain embodiments, the image generation system 36, the monitoring system 38, and the physical interaction system 40 may impose an interaction "cooldown" on guest interactions with particular themed attractions 116. In other words, for example, once a guest 18 has interacted with a particular themed attraction 116, that particular guest 18 may be prevented from making another interaction with that particular themed attraction 116 for a given amount of time (e.g., 15 minutes, 30 minutes, an hour, and so forth).

As illustrated in FIGS. 3 and 4, in certain embodiments, the structure 118 may be depicted (i.e., by the AR images 30 generated by the AR image generators 28, as instructed by the image generation system 36) as being restored such that depicted features of the restored structure 118 are based at least in part on the relative number of times guests 18 voted for the respective factions by, for example, interacting with the mobile device(s) 20, the wearable device(s) 22, the themed device(s) 24, and/or the physical object(s) 26 (e.g., including the faction flags 120). For example, in certain embodiments, a first faction flag 120A may be associated with a first faction, which may generally be recognized (e.g., based on the theme of the themed attraction 116) as being a relatively "good" faction, whereas a second faction flag 120B may be associated with a second faction, which may generally be recognized (e.g., again, based on the theme of the themed attraction 116) as being a relatively "evil" faction. As such, during the course of operation of the amusement park 10 during the day, guests 18 (e.g., either directly or indirectly via the employees 17) may interact with the mobile device(s) 20, the wearable device(s) 22, the themed device(s) 24, and/or the physical object(s) 26 (e.g., including the faction flags 120) to vote for, or otherwise show their support for, the faction of their choice. Based on these guest interactions (i.e., guest faction votes) with the mobile device(s) 20, the wearable device(s) 22, the themed device(s) 24, and/or the physical object(s) 26 (e.g., including the faction flags 120), the structure 118 may gradually be depicted by the AR images 30 generated by the AR image generators 28 (e.g., again, as instructed by the image generation system 36) as being restored in a way that is consistent with the guest faction votes. In addition, in certain embodiments, credits and/or points may be earned by the guests' chosen faction, which may be spent by the guests 18 on goods and services within the amusement park 10.

For example, if more guests 18 vote for the first (i.e., relatively "good") faction, the structure 118 may be depicted as being restored with relatively bright colors and with relatively sharp geometrical features. Conversely, if more guests 18 vote for the second (i.e., relatively "evil") faction, the structure 118 may be depicted as being restored with relatively dark colors and with relatively eroded geometrical features. In addition, the corresponding faction flag 120 that corresponds to the faction receiving more votes may be elevated (e.g., as the generated physical effect 32, as instructed by the physical interaction system 40) to a higher height than the faction flag 120 that corresponds to the faction receiving fewer votes. For example, as illustrated in FIG. 4, the faction flag 120A corresponding to the first (i.e., relatively "good") faction is elevated to a higher height than the faction flag 120B corresponding to the second (i.e., relatively "evil") faction because the first faction received more guest faction votes during the course of operation of the amusement park 10 (i.e., during the day of operation) than the second faction. In addition, as also illustrated in FIG. 4, because the first (i.e., relatively "good") faction received more guest faction votes than the second (i.e., relatively "evil") faction during the day of operation of the amusement park 10, the structure 118 is depicted by AR images 30 generated by the AR image generators 28 as having relatively sharp geometrical features.

As such, various guest interactions with the mobile device(s) 20, the wearable device(s) 22, the themed device(s) 24, and/or the physical object(s) 26 (e.g., including the faction flags 120) may be collectively tracked by the image generation system 36, the monitoring system 38, and the physical interaction system 40 during the course of operation of the amusement park 10 (e.g., during the day of operation) to determine the AR images 30 that may be generated by the AR image generators 28 (i.e., as instructed by the image generation system 36), and to determine the physical effects 32 that may be generated by the physical objects (e.g., the faction flags 120, as instructed by the physical interaction system 40). Specifically, in the scenario depicted in FIGS. 3 and 4, the various guest interactions with the mobile device(s) 20, the wearable device(s) 22, the themed device(s) 24, and/or the physical object(s) 26 (e.g., including the faction flags 120) may be collectively tracked by the image generation system 36, the monitoring system 38, and the physical interaction system 40 during the course of operation of the amusement park 10 (e.g., during the day of operation) to determine the how the structure 118 should be depicted as being restored using the AR images 30 generated by the AR image generators 28 (i.e., as instructed by the image generation system 36), and to determine the relative heights to which the faction flags 120 (i.e., as the physical objects 26) may be elevated (i.e., as the physical effects 32 instructed by the physical interaction system 40).

Figure 5:
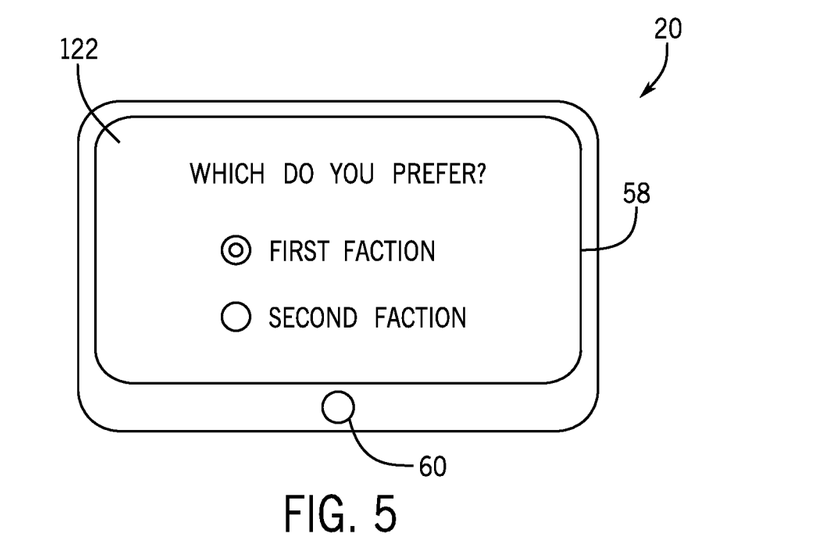
FIGS. 5 through 8 illustrate various ways in which guests may interact with mobile devices, wearable devices, themed devices, and/or physical objects disposed within the real-world environment of the amusement park with respect to the scenario depicted in FIGS. 3 and 4, in accordance with embodiments of the present disclosure.

FIGS. 5 through 8 illustrate various ways in which guests 18 may interact with the mobile device(s) 20, the wearable device(s) 22, the themed device(s) 24, and/or the physical object(s) 26 (e.g., including the faction flags 120) disposed within the real-world environment of the amusement park 10 with respect to the scenario depicted in FIGS. 3 and 4, in accordance with embodiments of the present disclosure. For example, FIG. 5 illustrates a graphical user interface 122, which may be displayed on a display 58 of a mobile device 20, and which includes options that enable a guest 18 (or an employee 17, as instructed by a guest 18) using the mobile device 20 to select (i.e., vote for) a preferred faction for the guest 18. It will be appreciated that the selection made by/for the guest 18 using the mobile device 20 may be communicated by the mobile device 20 to the image generation system 36 and/or the physical interaction system 40 as described herein to facilitate the image generation system 36 and/or the physical interaction system 40 to generate the AR images 30 and/or physical effects 32, respectively, based at least in part on the selection made by/for the guest 18 via the mobile device 20.

Figure 6:
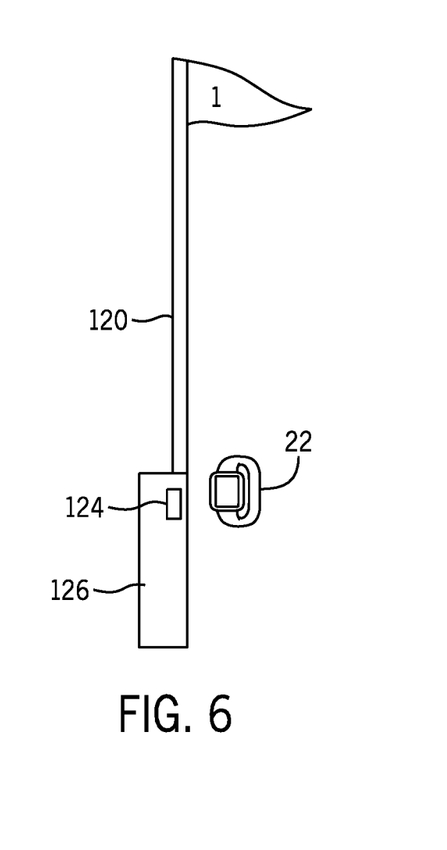

As another example, FIG. 6 illustrates a wearable device 22 being brought into relatively close proximity with (within a given, predetermined distance to, such as within 3 feet, within 2 feet, within 1 foot, or even closer, in certain embodiments) a physical object 26 (e.g., a faction flag 120, in the illustrated embodiment) that corresponds to the faction that the guest 18 wearing the wearable device 22 prefers. In certain embodiments, the proximity of the wearable device 22 relative to the particular faction flag 120 preferred by the guest 18 wearing the wearable device 22 may be detected by the monitoring system 38 (e.g., via the one or more tracking devices 94 of the monitoring system 38), and the detected proximity of the wearable device 22 with the faction flag 120 may be communicated by the monitoring system 38 to the image generation system 36 and/or the physical interaction system 40 as described herein to facilitate the image generation system 36 and/or the physical interaction system 40 to generate the AR images 30 and/or physical effects 32, respectively, based at least in part on the detected proximity of the wearable device 22 with the faction flag 120, which is indicative of a vote for the faction corresponding to the faction flag 120 to which the wearable device 22 is brought into relatively close proximity.

However, in other embodiments, the proximity of the wearable device 22 relative to the particular faction flag 120 preferred by the guest 18 wearing the wearable device 22 may be detected by a sensor 124, for example, disposed on or within a portion (e.g., a base 126, in certain embodiments) of the faction flag 120 that is configured to detect when wearable devices 22 are brought into close proximity or, indeed, tap against the sensor 124, and the detected proximity of the wearable device 22 with the faction flag 120 may be communicated by the faction flag 120 (e.g., via the one or more communications interfaces 106 of the faction flag 120) to the image generation system 36 and/or the physical interaction system 40 as described herein to facilitate the image generation system 36 and/or the physical interaction system 40 to generate the AR images 30 and/or physical effects 32, respectively, based at least in part on the detected proximity of the wearable device 22 with the faction flag 120, which is indicative of a vote for the faction corresponding to the faction flag 120 to which the wearable device 22 is brought into relatively close proximity.

In yet other embodiments, the proximity of the guest 18 relative to the particular faction flag 120 preferred by the guest 18 may be detected by the one or more tracking devices 94 of the monitoring system 38, and the detected proximity of the wearable device 22 with the faction flag 120 may be communicated by the monitoring system 38 to the image generation system 36 and/or the physical interaction system 40 as described herein to facilitate the image generation system 36 and/or the physical interaction system 40 to generate the AR images 30 and/or physical effects 32, respectively, based at least in part on the detected proximity of the guest 18 with the faction flag 120, which is indicative of a vote for the faction corresponding to the faction flag 120 to which the guest 18 comes into relatively close proximity.

Figure 7:
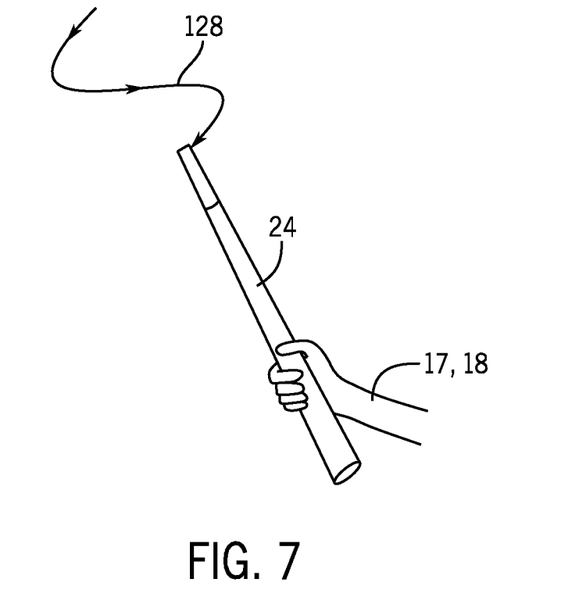

As yet another example, FIG. 7 illustrates a themed device 24 being manipulated by a guest 18 (or by an employee 17, as instructed by a guest 18) to indicate that the guest 18 prefers a particular faction. For example, in certain embodiments, as illustrated in FIG. 7, the themed device 24 may be in the form of a magic wand, and the guest 18 (or an employee 17, as instructed by a guest 18) may move the themed device 24 in a particular pattern 128 (e.g., as the magic wand casting a particular spell) that is known to be associated with the particular faction preferred by the guest 18. In certain embodiments, the motion of the themed device 24 (i.e., that corresponds to the pattern 128) may be detected by the monitoring system 38 (e.g., via the one or more tracking devices 94 of the monitoring system 38), and the detected motion of the themed device 24 may be communicated by the monitoring system 38 to the image generation system 36 and/or the physical interaction system 40 as described herein to facilitate the image generation system 36 and/or the physical interaction system 40 to generate the AR images 30 and/or physical effects 32, respectively, based at least in part on the detected motion of the themed device 24, which is indicative of a vote for the faction corresponding to the pattern 128. However, in other embodiments, the motion of the themed device 24 (i.e., that corresponds to the pattern 128) may be detected by the one or more orientation and position sensors 78 of the themed device 24, and the detected motion of the themed device 24 may be communicated by the themed device 24 (e.g., via the one or more communications interfaces 82 of the themed device 24) to the image generation system 36 and/or the physical interaction system 40 as described herein to facilitate the image generation system 36 and/or the physical interaction system 40 to generate the AR images 30 and/or physical effects 32, respectively, based at least in part on the detected motion of the themed device 24, which is indicative of a vote for the faction corresponding to the pattern 128.

Figure 8:
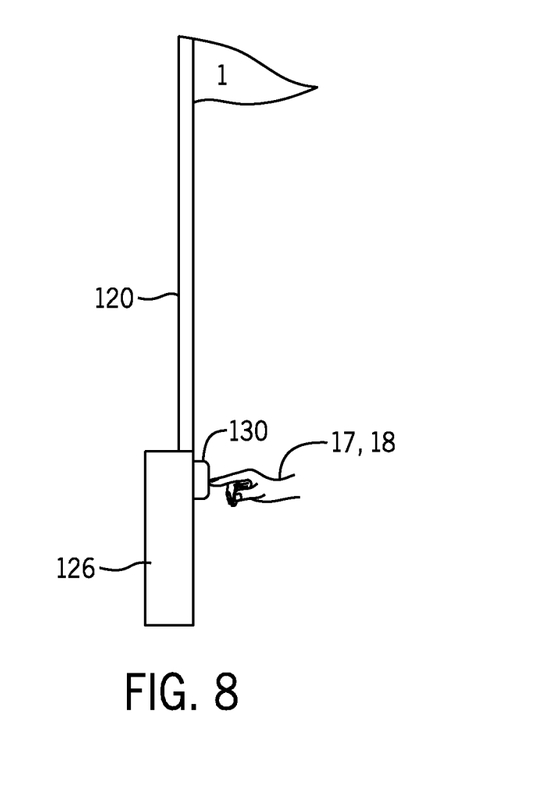

As yet another example, FIG. 8 illustrates a guest 18 (or an employee 17, as instructed by a guest 18) interacting with a physical object 26, for example, a particular faction flag 120 that corresponds to a preferred faction of the guest 18. For example, as illustrated in FIG. 8, in certain embodiments, the guest 18 may interact with (e.g., push, pull, turn, flip, and so forth) an input 130 (e.g., button, knob, switch, and so forth) associated with the particular faction flag 120 to cast a vote for the particular faction associated with the particular faction flag 120. It will be appreciated that the direct interaction with the physical object 26 (i.e., the input 130 of the faction flag 120 in the embodiment illustrated in FIG. 8) may be communicated by the physical object 26 (i.e., the faction flag 120) to the image generation system 36 and/or the physical interaction system 40 as described herein to facilitate the image generation system 36 and/or the physical interaction system 40 to generate the AR images 30 and/or physical effects 32, respectively, based at least in part on the selection made by the guest 18, for example, via direct interaction with the input 130 of the faction flag 120.

Figure 9:
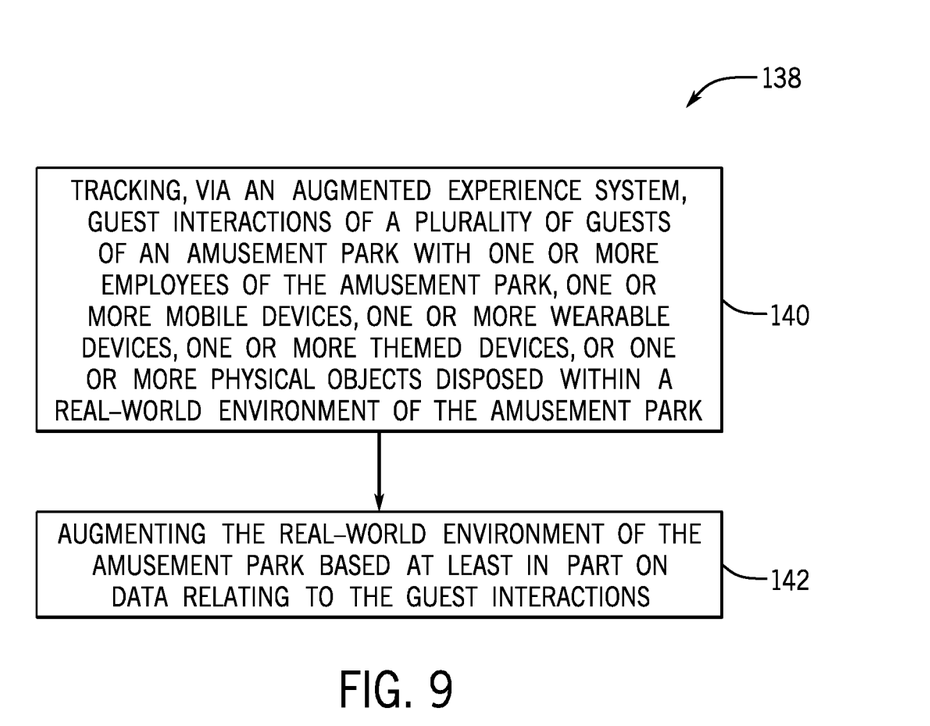
FIG. 9 illustrates a method of operating the augmented experience system described herein, in accordance with embodiments of the present disclosure.

FIG. 9 illustrates a method 138 of operating the augmented experience system 34 described herein, in accordance with embodiments of the present disclosure. For example, in certain embodiments, the method 138 includes tracking, via the augmented experience system 34, guest interactions of a plurality of guests 18 of the amusement park 10 with one or more employees 17 of the amusement park 10, one or more mobile devices 20, one or more wearable devices 22, one or more themed devices 24, or one or more physical objects 26 disposed within a real-world environment of the amusement park 10 (block 140). In addition, in certain embodiments, the method 138 includes augmenting, via the augmented experience system 34, the real-world environment of the amusement park 10 based at least in part on data relating to the guest interactions (block 142).

While only certain features have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. § 112(f). However, for any claims containing elements designated in any other manner, it is intended that such elements are not to be interpreted under 35 U.S.C. § 112(f).

The invention claimed is:

1. An amusement park system, comprising:
   a monitoring system configured to monitor one or more employees of an amusement park, one or more mobile devices, one or more wearable devices, one or more themed devices, or one or more physical objects disposed within a real-world environment of the amusement park to detect a plurality of guest interactions of a plurality of guests of the amusement park during a time period; and
   an augmented experience system configured to generate images and/or implement physical effects in the real-world environment based at least in part on data relating to the plurality of guest interactions detected by the monitoring system during the time period.

2. The amusement park system of claim 1, wherein the plurality of guest interactions comprise interactions with inputs of the one or more mobile devices, the one or more wearable devices, or the one or more physical objects.

3. The amusement park system of claim 1, wherein the plurality of guest interactions comprise position, orientation, or motion of the plurality of guests, the one or more mobile devices, the one or more wearable devices, or the one or more themed devices.

4. The amusement park system of claim 3, wherein the position, orientation, or motion of the one or more mobile devices, the one or more wearable devices, or the one or more themed devices is detected by one or more orientation and position sensors disposed within the one or more mobile devices, the one or more wearable devices, or the one or more themed devices.

5. The amusement park system of claim 3, wherein the position, orientation, or motion of the one or more mobile devices, the one or more wearable devices, or the one or more themed devices is detected by one or more tracking devices of the monitoring system.

6. The amusement park system of claim 1, wherein the plurality of guest interactions comprise proximity of at least the plurality of guests, the one or more mobile devices, the one or more wearable devices, or the one or more themed devices with the one or more physical objects.

7. The amusement park system of claim 1, wherein the augmented experience system comprises an image generation system configured to generate the images based at least in part on the data relating to the plurality of guest interactions detected by the monitoring system during the time period, and to transmit the images to one or more image generators disposed within the real-world environment of the amusement park.

8. The amusement park system of claim 7, wherein the image generation system is configured to generate the images based at least in part on the current time of day, the current date, or the current weather of the real-world environment of the amusement park.

9. The amusement park system of claim 1, wherein the augmented experience system comprises a physical interaction system configured to determine the physical effects to be implemented based at least in part on the data relating to the plurality of guest interactions detected by the monitoring system during the time period, and to transmit one or more control signals to one or more physical objects to implement the determined physical effects.

10. The amusement park system of claim 9, wherein the physical interaction system is configured to determine the physical effects based at least in part on the current time of day, the current date, or the current weather of the real-world environment of the amusement park.

11. The amusement park system of claim 1, wherein the augmented experience system is configured to generate the images and/or implement the physical effects in the real-world environment based at least in part on local settings stored in the one or more mobile devices, the one or more wearable devices, or the one or more themed devices.

12. The amusement park system of claim 1, wherein the augmented experience system is configured to generate the images and/or implement the physical effects in the real-world environment based at least in part on global settings of the amusement park.

13. The amusement park system of claim 1, wherein the one or more mobile devices comprise one or more mobile phones or tablet computers.

14. The amusement park system of claim 1, wherein the one or more wearable devices comprise one or more watch-like electronic devices, bracelets, amulets, rings, headbands, glasses, hats, helmets, t-shirts, jackets, coats, shorts, pants, shoes, boots, or other wearable items.

15. The amusement park system of claim 1, wherein the one or more themed devices comprise toy guns, swords, flags, or wands.

16. A method, comprising:
   monitoring, via a monitoring system, one or more employees of an amusement park, one or more mobile devices, one or more wearable devices, one or more themed devices, or one or more physical objects disposed within a real-world environment of the amusement park to detect guest interactions of a plurality of guests of the amusement park during a time period;
   generating, via an image generation system, one or more images based at least in part on data relating to the guest interactions detected by the monitoring system;
   transmitting the images from the image generation system to one or more image generators disposed within the real-world environment of the amusement park;
   determining, via a physical interaction system, one or more physical effects to be implemented for the one or more physical objects based at least in part on the data relating to the guest interactions detected by the monitoring system; and transmitting one or more control signals from the physical interaction system to the one or more physical objects to implement the determined one or more physical effects.

17. The method of claim 16, wherein the guest interactions comprise interactions with inputs of the one or more mobile devices, the one or more wearable devices, or the one or more physical objects.

18. The method of claim 16, wherein the guest interactions comprise position, orientation, or motion of the plurality of guests, the one or more mobile devices, the one or more wearable devices, or the one or more themed devices.

19. The method of claim 18, wherein the position, orientation, or motion of the one or more mobile devices, the one or more wearable devices, or the one or more themed devices is detected by one or more orientation and position sensors disposed within the one or more mobile devices, the one or more wearable devices, or the one or more themed devices.

20. The method of claim 18, wherein the position, orientation, or motion of the one or more mobile devices, the one or more wearable devices, or the one or more themed devices is detected by one or more tracking devices of the monitoring system.

21. The method of claim 16, wherein the guest interactions comprise proximity of at least the plurality of guests, the one or more mobile devices, the one or more wearable devices, or the one or more themed devices with the one or more physical objects.

* * * * *